Aug. 3, 1954
K. K. PALUEV
2,685,677
COOLING SYSTEM FOR ELECTRICAL APPARATUS
Filed Nov. 29, 1950
2 Sheets-Sheet 2
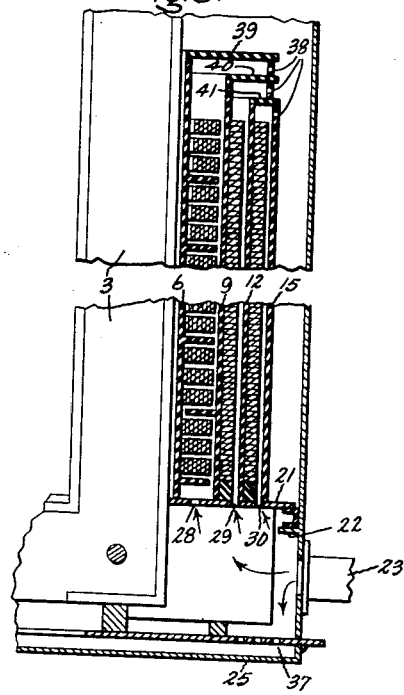
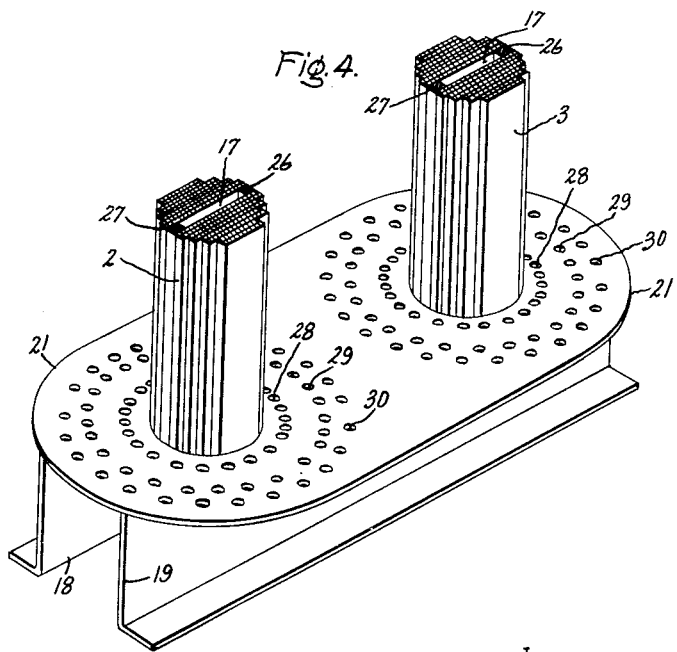
Inventor:
Konstantin K. Paluev,
by Ernest C. Britton
His Attorney.

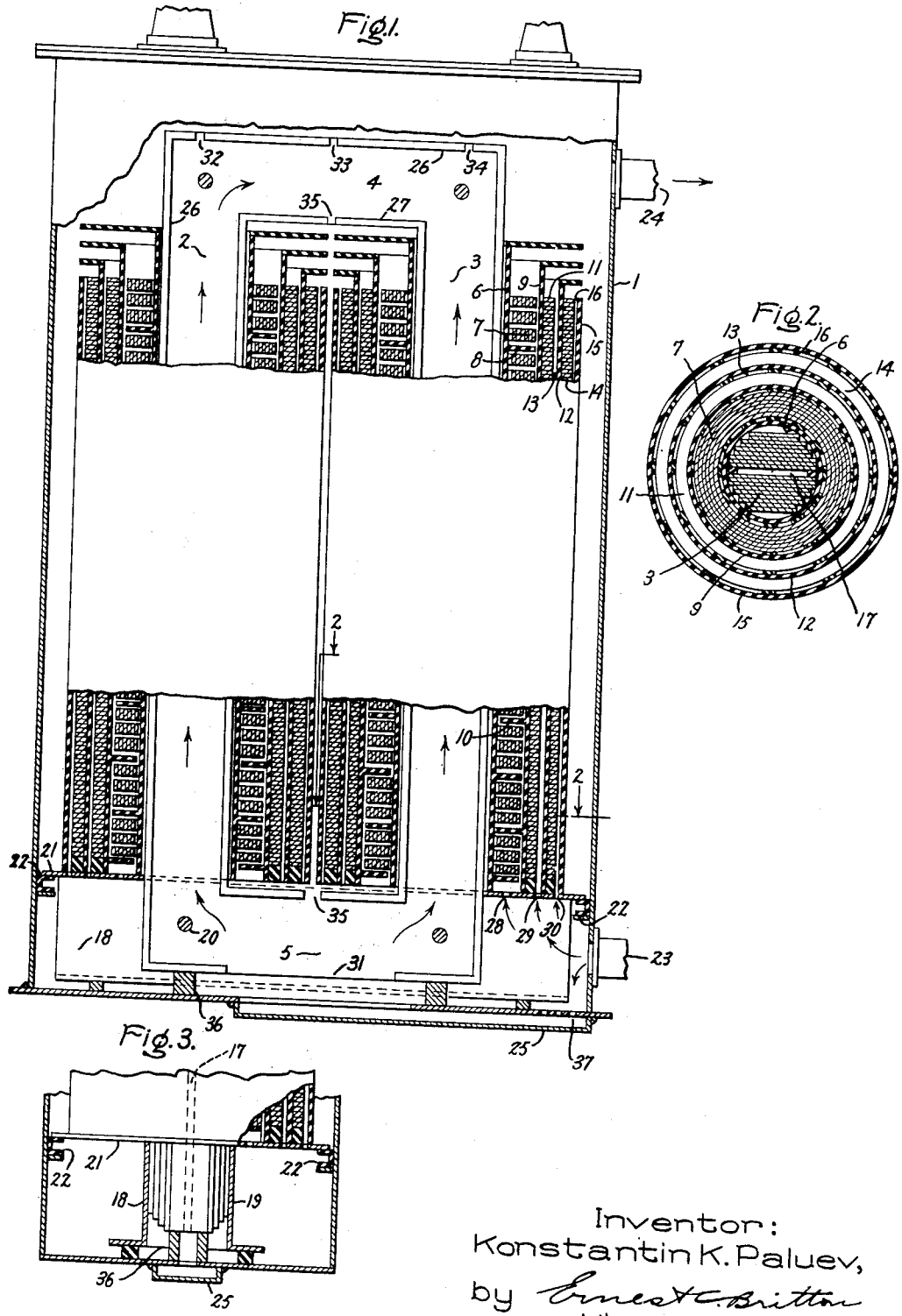
Inventor:
Konstantin K. Paluev,
by Ernest C. Britton
His Attorney.

Patented Aug. 3, 1954

2,685,677

UNITED STATES PATENT OFFICE 2,685,677

COOLING SYSTEM FOR ELECTRICAL APPARATUS

Konstantin K. Paluev, Pittsfield, Mass., assignor to General Electric Company, a corporation of New York Application November 29, 1950, Serial No. 198,115

4 Claims. (Cl. 336—57)

This invention relates to electrical apparatus, and more particularly to an improved cooling arrangement for such apparatus.

Electrical apparatus of large size, such as large size transformers, for example, are often provided with forced-flow fluid cooling systems. In a cooling system for a stationary electrical induction apparatus, for example, a pump forces the flow of a cooling and insulating fluid such as oil, in heat exchange relation to the apparatus, thereby extracting heat from the windings and magnetic core of the stationary electrical induction apparatus.

While the principle of my invention is applicable to any type of electrical apparatus having cooling paths of different resistances, it is particularly applicable to stationary electrical induction apparatus having a plurality of cooling paths. Hence, I will describe my invention as embodied in a stationary electrical induction apparatus.

A considerable problem is presented in connection with the cooling of electrical apparatus having a plurality of flow paths with different resistances to fluid flow. For example, in a stationary electrical induction apparatus, such as a transformer, having one or more types of electrical windings and a magnetic core, all of which have to be cooled, difficulty is experienced in providing cooling fluid flow in correct proportions to the various components of the apparatus due to the different resistances to fluid flow of the different paths.

Also, due to the different electrical properties of the various portions of the stationary electrical induction apparatus, and due to differences in physical position which affect the heat dissipation of the various components, the cooling requirements of the various components of the electrical induction apparatus are sometimes different. It can be seen that it would be advantageous to be able to adjust the fluid flow to the various components of the apparatus in accordance with their respective cooling requirements.

Efforts have been made heretofore to control distribution of cooling fluid between the various windings and the core of electrical induction apparatus in a manner which would insure optimum cooling of the apparatus. Such efforts have been directed largely heretofore along the line of varying the ducts between the various windings and adjacent insulating cylinders and between the magnetic core and its adjacent insulating cylinder so as to secure a proper ratio of resistance to fluid flow between these various elements.

Experience has shown, however, that adjustment of the resistance to fluid flow in order to obtain a proper fluid distribution is both expensive and uncertain when the adjustment is made by varying the fluid-flow ducts as heretofore described. This uncertainty arises from the difficulty experienced in estimating resistance to fluid flow of a complicated fluid flow path such as the conventional zig-zag flow around the winding elements. Also, in the case of large size transformers, it has been found that the resistance to fluid flow of some of the very commonly used windings is many times greater than that of the magnetic core or of some other types of windings commonly used. For this reason, it has generally not been practicable to use forced liquid cooling for the magnetic cores of forced-cooled transformers, since practically the entire fluid flow would be through the magnetic core, rather than through the winding sections, due to the great disparity in resistance to fluid flow of the core and windings. For this reason, it has been common practice to use free convection fluid circulation for cooling the cores of transformers which are otherwise forced cooled.

A disproportionate fluid flow distribution is also liable to occur where a plurality of types of windings are used in the same electrical apparatus. For example, where a disk or pancake-type winding is used in the same apparatus with a so-called barrel type winding, a disproportionate amount of the cooling fluid will pass to the barrel winding, since it has a relatively low resistance to fluid flow as compared to the disk or pancake coils, which have a relatively high resistance to fluid flow.

Accordingly, it is an object of my invention to provide a new and improved cooling system for use with electrical apparatus.

It is a further object of my invention to provide a fluid cooling system for use with electrical apparatus which provides for a distribution of the fluid coolant between the various components of the electrical apparatus in accordance with their respective cooling requirements.

In accordance with my invention, I introduce fluid flow resistances into the various flow paths of an electrical apparatus in order to obtain predetermined fluid flows through the respective paths. When applied to an electrical induction apparatus, my invention provides for the introduction of proper fluid flow resistances externally of the windings and the core ducts of the electrical induction apparatus, these external fluid flow resistances being adjustable and theoretically predictable to permit proper fluid distribution between the various elements of the electrical induction apparatus.

The features of my invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 is an elevation view, partially cut away, of an electrical induction apparatus embodying fluid flow resistances in accordance with my invention; Fig. 2 is a cross-sectional view along line 2—2 of one of the core legs of the electrical induction apparatus of Fig. 1; Fig. 3 is an end view of the lower portion of the electrical induction apparatus shown in Fig. 1; Fig. 4 is a perspective view of a portion of an electrical induction apparatus containing the embodiment of my invention shown in Figs. 1, 2 and 3; while Fig. 5 is a view of a stationary electrical induction apparatus embodying a modified type of fluid flow resistance in accordance with my invention.

Referring now to the drawing, there is shown in Fig. 1 a containing tank 1 for a stationary electrical induction apparatus. Interiorly of tank 1 is a magnetic core having leg members 2 and 3 and upper and lower yoke members 4 and 5 respectively. Each of the core legs is surrounded by a plurality of electrical windings. While in the embodiment shown in Fig. 1, a similar winding arrangement is used around each of the respective legs 2 and 3, this need not necessarily be so, since my invention applies equally well whether each leg has an identical winding arrangement or not.

Coaxially mounted around core leg 3 is an insulating cylinder 6, which is, in turn, coaxially surrounded by a winding 7 of the disk or pancake type.

Each disk or pancake type coil comprises a plurality of conducting turns spirally wound in the same plane. These coils are stacked in superposed relation to each other and are connected in series electrical relation. Each of the respective disks or pancake coils is separated from its adjacent coils by radial spacers which provide for a flow of cooling fluid in a radial direction between the respective disk or pancake coils. At spaced intervals axially of the insulating cylinder 6, flange-like collars 8 are provided to direct fluid flow through the disk coils, as will be explained hereinafter. Radially outwardly of the outer edge of the disk coil 7, a second insulating cylinder 9 is positioned, and flange-like collars 10 are provided at spaced-apart intervals on the radially inner surface of cylinder 9 to direct fluid flow in cooperation with the collars 8 on cylinder 6. It will be noted that the flange collars 8 on cylinder 7 extend radially outwardly almost to the radially inner surface of cylinder 9, while the flange collars 10 on cylinder 9 extend radially inwardly almost to the radially outer surface of cylinder 6. The flange collars 8 and 10 are alternately arranged at spaced intervals, with a plurality of the disk or pancake coils 7 being included between successive collar members. Due to the aforementioned alternate arrangement of the collar members 8 and 10, cooling fluid is caused to alternately flow radially outwardly and inwardly due to the fact that the alternate arrangement of the collar members 8 and 10 provides blocking action in alternate directions. This type of fluid flow and the construction hereinbefore described is not a part of this invention but is merely shown and described to illustrate a "zig-zag" type of cooling fluid flow often used in electrical induction apparatus. Such a fluid flow path provides a relatively high resistance to fluid flow, and also a resistance which is often difficult to calculate accurately in advance.

Positioned on the radially outer surface of insulating cylinder 9 is a winding 11 of the barrel type comprising a single conductor continuously wound in a spiral form around the cylinder, the conductor advancing axially with each turn, and with no spaces being provided between adjacent turns for cooling purposes. A third insulating cylinder 12 is positioned radially outwardly of barrel winding 11, the duct 13 between the radially outer surface of barrel winding 11 and the radially inner surface of cylinder 12 serving as a path for the flow of cooling fluid which cools barrel winding 11.

On the radially outer surface of cylinder 12, a second winding 14 of the barrel type is positioned. Radially outwardly of barrel winding 14 is a fourth insulating cylinder 15 which serves to insulate the winding 14 from the inner surface of the casing 1. A duct 16 is provided between the radially outer surface of winding 14 and the radially inner surface of cylinder 15. The cooling liquid for winding 14 passes through this duct 16.

The various windings illustrated in Fig. 1 and hereinbefore described represent a typical electrical winding arrangement for a stationary electrical induction apparatus such as a transformer, and illustrate the diversity of cooling paths which the cooling fluid for the various windings must travel. The disk or pancake type winding 7 with its zig-zag flow arrangement presents a path of relatively high fluid flow resistance. On the other hand, the barrel windings 11 and 14 present a path of relatively low resistance to fluid flow.

In order to provide suitable cooling for the magnetic core structure, the core is provided with an axial slot 17 as can best be seen in the cross-sectional view of Fig. 2 taken along the line 2—2 of Fig. 1. The axial slot 17 extends through the legs and yoke sections, and is in a plane parallel to the plane of the laminations constituting the magnetic core. The slot may be obtained by entirely omitting several laminar layers of magnetic material. Although in the embodiments of this application I provide a slot lying in a plane parallel to the plane of the laminations forming the magnetic core, as illustrated by slot 17, I could provide slots through the magnetic core in a plane perpendicular to the laminations. As will be explained hereinafter, sealing means are provided so that the forced fluid flow through the magnetic core is confined to the slot 17.

As will best be seen in Figs. 3 and 4, a clamping structure comprising a pair of angle bars 18 and 19 extends transversely across the lower yoke member 5, being positioned on opposite surfaces of the yoke structure, and serves to clamp the interleaved leg and yoke laminations together in a rigid manner. A similar pair of angle bars is used to clamp the upper end of the core. The clamping members 18 and 19 on the opposed surfaces of the respective yoke members 4 and 5 are held together by bolts 20.

In order to provide a control of the cooling fluid flow as will be hereinafter described, an apertured diaphragm member 21 is provided, diaphragm 21 resting upon the upper edge of the lower pair of angle bars 18 and 19. Diaphragm member 21 conforms on its outer edge of the inner surface of tank 1, the outer peripheral edge of diaphragm 21 being very slightly spaced away from the inner surface of tank 1 in order to permit positioning diaphragm 21 in place. The inner periphery of diaphragm 21 conforms to the periphery of legs 2 and 3 of the magnetic core. A suitable sealing means 22 is provided between the outer edge of the diaphragm 21 and the inner surface of the tank 1 to prevent any leakage of cooling fluid between these two surfaces.

A conduit 23 is provided at the lower end of tank 1 in order to conduct the cooling and insulating fluid into the tank 1 from any suitable external cooling means which may be provided. A similar conduit 24 is provided at the upper end of the tank to conduct fluid away from the tank and to the external cooling means.

A compartment 25 is provided below the bottom surface of the tank 1 to serve as a distribution manifold for the cooling fluid which passes to the magnetic core, as will be explained hereinafter.

In accordance with one form of my invention as will be explained hereinafter, the diaphragm member 21 upon which the lower end of the various windings rest, is apertured adjacent the ducts between the windings in such manner that a desired fluid distribution is obtained between the various windings and between the various windings and the magnetic core.

As has been explained hereinbefore, an axial slot 17 is provided through the central portion of the magnetic core in order to provide a path for the flow of cooling fluid which cools the magnetic core structure. This slot 17 may be seen in Fig. 2, and the cross-sectional view of Fig. 1 is taken through the axial plane of the induction apparatus which includes the slot 17. In order to provide an adequate control of the fluid flow through slot 17, a frame 26 of wood, or any other suitable material, extends around the outer edge of the entire slot in order to prevent entrance or exit of the fluid at any except desired positions. A similar frame 27 extends along the inner edge of slot 17. As will be explained hereinafter, the frames 26 and 27 have orifices at certain places in order to control the resistance to fluid flow through the slot 17.

In accordance with my invention, I introduce resistances into the fluid flow paths to the various components of the electrical apparatus such as, for example, into the flow path to the various windings and to the magnetic core, in order to obtain a proper proportionate distribution of fluid flow between these various flow paths.

In order to control the fluid flow to the various windings, I provide diaphragm 21 with a plurality of orifices lying in the respective flow paths, the quantity and size of the orifices being controlled in such manner as to produce an approximation of the desired fluid flow resistance. Thus, I have provided a group of orifices 28 in series with the fluid flow to the disk type winding 7, a group of orifices 29 in series with the fluid flow to barrel type windings 11 and a group of orifices 30 in series with the cooling fluid flow to barrel winding 14. These orifices just described may be seen best in the perspective view of Fig. 4. This orificed construction is in contrast to the conventional construction which merely provides unproportioned circumferential open slots underneath the paths to these respective windings. The orifices 28, 29 and 30 may consist of round holes or slots. By proportioning the distance between holes of a given path and their diameter and distance to the nearest obstacle facing them, the fluid flow resistance can be made to be proportional to the shape factor of the orifices and inversely proportional to the second order of total cross section of all of the orifices in parallel.

In order to control the fluid flow resistance of the slot 17, I provide the frames 26 and 27 which almost completely enclose the outer and inner edges, respectively, of slot 17 with several orifices which will now be described. Before reaching the orifices in the frame, the cooling fluid enters slot 17 through a wide opening 31 at the bottom edge of frame 26. At the top or upper portion of the frame 26 I provide a plurality of small orifices which have been designated by the numerals 32, 33, and 34. While from a theoretical standpoint the use of the upper orifices 32, 33, and 34 alone would be sufficient to provide a desired fluid flow resistance through the slot 17, yet I prefer to use an additional set of orifices in the fluid flow path to the magnetic core, with the additional set of orifices being displaced from the orifices 32, 33, and 34. If only orifices 32, 33, and 34 at the upper end of frame 26 were used, an undesirable fountain effect might result at these orifices due to the pressure drop absorbed by the orifices. Such a fountain effect might result in the false operation of relays. Yet, from the standpoint of adjustability it is desirable to have orifices such as 32, 33, and 34 located near the top of the transformer. The additional set of orifices in the flow path to the magnetic core are preferably located in the lower end of the tank or enclosure for the apparatus, and, in the embodiment illustrated in Fig. 1, are shown at 37 in the bottom of the tank, in the fluid path to the manifold 25. However, orifices 37 may be positioned anywhere in the fluid flow path to the magnetic core if suitably displaced from orifices 32, 33, and 34. For example orifices 37 might be positioned in the lower edge of frame 26 in the position occupied by opening 31.

As has been mentioned, in addition to the frame 26 which extends around the outer periphery of the slot 17, I have also provided a frame 27 which extends around the inner periphery of the slot 17, thus preventing any leakage or entrance of cooling fluid at the inner periphery of the slot 17 except where desired. In order to eliminate the possibility of stagnant cooling fluid being present along the bottom and top edges of the frame 27 at the inner periphery of the slot 17, I have provided frame 27 with a suitable number of small orifices 35 at appropriate locations along the upper and lower portions of the frame 27.

The fluid which passes to the slot 17 of the magnetic core first passes down through the bottom of the tank 1 into the manifold 25 positioned below the bottom of the tank. The fluid then passes upwardly to slot 17. A suitable seal member 36 is positioned between the manifold 25 and the slot 17 to insure that fluid flows directly between these two members and is not diverted to any other path.

The fluid flow resistance of the fluid path through the slot 17 is determined by the sum of the fluid flow resistance of slot 17 itself, plus the fluid flow resistances of orifices 32, 33, 34, and 37.

I may use my fluid flow resistances to obtain predetermined fluid flow through a plurality of flow paths whether the natural fluid flow resistances of the respective paths are known or are unknown. Where the fluid flow resistance of a given flow path is unknown, I make the values of the resistance which I introduce of such value that the added resistance dominates the total resistance of the unknown flow path. Thus, if the fluid flow resistance values of all of the paths are unknown, I introduce dominating resistances into all of the paths, so that the fluid flows in the respective paths are in proportion to the respective dominating resistance values.

On the other hand, if the fluid flow resistances are known, but are of such value as to provide fluid flows which are not proportional to the cooling requirements of the various paths, I introduce resistances of such values in the respective paths as to provide the desired distribution of cooling fluid.

If the resistances of some paths are known and other paths are unknown, I adjust the total resistance of each of the paths in such manner as to provide the desired fluid flow distribution.

There is shown in Fig. 5 a modified form of my invention in which the orifices which control the fluid flow to the various windings such as the disk type winding 7, and the barrel windings 11 and 14, are positioned in the upper portion of the structure near the tank cover, rather than in the lower portion of the tank, thereby facilitating adjustment of the orifices due to their easier accessibility. The insulating cylinders 6, 9, 12 and 15 shown in Fig. 5 are provided with orifices 38 between the circumferential flange members 39, 40 and 41 which are provided on the respective insulating cylinders 6, 9 and 12. These flanges 39, 40 and 41 are conventionally used to provide a continuous insulating barrier between the respective windings and ground, and ordinarily the space between the various flanges comprise open ducts which have no orifice effect. In accordance with my invention, I propose to block the ducts between the respective flanges 39, 40 and 41 and also between the top of unflanged cylinder 15 and flange 41 entirely around the circumference thereof, providing controlled orifices 38 at spaced-apart intervals and of such number and size as to provide the desired fluid flow resistance. When I use orifices 38 as shown in Fig. 5, I need not provide orifices such as 28, 29 and 30 in the diaphragm 21 below the respective windings since the orifices 38 are a substitute and alternative to using the orifices 28, 29 and 30 in the diaphragm 21. However, the rest of the structure is the same as that shown in Fig. 1, with a distribution manifold being used below the bottom of the transformer tank to distribute fluid to the duct or slot 17 in the magnetic core, and with orifices 32, 33 and 34 being used in the frames 26 and 27 as has been previously described, and with orifices 37 being used as a supplemental resistance in the fluid flow path to the duct 17 in the magnetic core structure.

It can be seen that I have provided a new and improved construction for regulating fluid flow to an electrical apparatus by adding supplemental fluid flow resistances into the paths to the various components of the apparatus. In the case of stationary electrical induction apparatus, the supplemental fluid flow resistances in accordance with my invention provide an easy and convenient way of controlling fluid flow to the windings and core of the electrical induction apparatus without modifying the structures which are best suited to serve their other requirements.

While there have been shown and described particular embodiments of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In an electrical induction apparatus contained within an enclosing tank and having a magnetic core and a plurality of electrical windings disposed on said magnetic core, duct means defining a plurality of paths for the flow of cooling fluid adjacent said electrical windings and adjacent said magnetic core, certain of said respective cooling paths having a different natural resistance to fluid flow than others of said paths due to the differences in configuration of said paths, fluid flow resistances interposed in the respective fluid flow paths to provide a predetermined fluid flow division between said plurality of paths, said fluid flow resistances being positioned within said enclosing tank adjacent the termini of said paths and comprising barrier members interposed in the respective fluid flow paths, each of said barrier members being provided with a plurality of peripherally displaced apertures, the apertures for a given path in any given barrier member being arranged in parallel with respect to said fluid flow, the number and size of the apertures in said barrier members being so proportioned as to cause a division of fluid flow between said paths in accordance with the optimum cooling requirements for the parts adjacent said paths.

2. In a stationary electrical induction apparatus contained within an enclosing tank and having a magnetic core and a plurality of electrical windings disposed about said magnetic core, duct means being provided adjacent each of said windings to provide a path for the flow of a cooling fluid to said windings, a diaphragm member near one end of the enclosing tank for said apparatus, said enclosing tank having an inner periphery and said core having an outer periphery, said diaphragm member conforming to the inner periphery of said enclosing tank and also to the outer periphery of said magnetic core, said diaphragm member serving as a support member for one end of said windings, said diaphragm member being provided with a plurality of peripherally displaced orifices adjacent the cooling ducts for the said respective windings, structure defining a fluid flow path to said magnetic core, means for sealing the fluid flow paths to said respective windings from the fluid flow path to said magnetic core, said magnetic core being provided with a passage to provide a path for cooling fluid through said magnetic core, a frame means extending around the outer and inner periphery of said passage through said magnetic core, said frame means being provided with orifices to provide a predetermined fluid flow resistance through said passage, said orifices in said diaphragm and in said frame means being of such number and size as to cause a fluid flow division between said fluid flow paths to said windings and to said core in accordance with the optimum cooling requirements for the parts adjacent said paths.

3. In a stationary electrical induction apparatus contained within an enclosing tank having a magnetic core and a plurality of electrical windings coaxially disposed about said magnetic core, coaxially disposed insulating cylinders respectively interposed between said magnetic core and the electrical winding closest to said core and between adjacent windings, each of said cylinders being displaced slightly in a radial direction from at least one of the windings to which it is adjacent, the space between said cylinders and said windings constituting ducts for the passage of a cooling fluid to said windings, a diaphragm member adjacent one end of said magnetic core, said enclosing tank having an inner periphery and said core having an outer periphery, said diaphragm member conforming to the inner periphery of said enclosing tank and also to the outer periphery of said magnetic core, said diaphragm member serving as a support member for one end of said windings and of said insulating cylinders, said diaphragm member being provided with a plurality of peripherally-displaced orifices adjacent the cooling ducts for the respective windings, structure defining a fluid flow path to said magnetic core, means for sealing the fluid flow path to said respective windings from the fluid flow path to said magnetic core, said magnetic core being provided with a passage to provide a path for cooling fluid through said magnetic core, a frame means extending around the outer and inner periphery of said passage through said magnetic core, said frame means being provided with orifices which provide a predetermined fluid flow resistance through said passage, said orifices in said diaphragm and in said frame means being of such number and size as to cause a fluid flow division between said fluid flow paths to said windings and to said core in accordance with the optimum cooling requirements for the parts adjacent said paths.

4. In a stationary electrical induction apparatus contained within an enclosing tank and having a magnetic core and a plurality of electrical windings disposed about said magnetic core, with fluid circulating means for forcibly circulating a cooling fluid through said windings, duct means being provided adjacent each of said windings to provide a path for the flow of a cooling fluid to said windings, a diaphragm member near one end of the enclosing tank for said apparatus, said enclosing tank having an inner periphery and said core having an outer periphery, said diaphragm member conforming to the inner periphery of said enclosing tank and also to the outer periphery of said magnetic core, with means for producing a predetermined division of fluid flow between said windings comprising a plurality of peripherally spaced apertures in said diaphragm in series with said ducts, the apertures in said diaphragm which are in series with any given duct being in parallel with each other, the number and size of the apertures in series with said ducts being so proportioned as to provide a predetermined division of fluid flow between said windings in accordance with the optimum cooling requirements for the parts adjacent said paths.

References Cited in the file of this patent

UNITED STATES PATENTS

| Number | Name | Date |
|---|---|---|
| 1,304,257 | Brand | May 20, 1919 |
| 1,424,259 | Peters | Aug. 1, 1922 |
| 1,523,378 | Lennox | Jan. 13, 1925 |
| 2,388,565 | Paluev | Nov. 6, 1945 |
| 2,388,566 | Paluev | Nov. 6, 1945 |
| 2,440,556 | Paluev | Apr. 27, 1948 |
| 2,459,322 | Johnston | Jan. 18, 1949 |